UNITED STATES PATENT OFFICE.

WILLIAM D. STYRON, OF NORFOLK, VIRGINIA, ASSIGNOR OF THREE-FOURTHS TO OBED E. WHITEHURST, GEO. A. HINKLE, AND HENRY B. NICHOLS, ALL OF SAME PLACE.

FERTILIZER COMPOUND.

SPECIFICATION forming part of Letters Patent No. 268,314, dated November 28, 1882.

Application filed May 13, 1882. (No specimens.)

*To all whom it may concern:*

Be it known that I, WILLIAM DIXON STYRON, of Norfolk, in the county of Norfolk and State of Virginia, have invented a new and Improved Fertilizer Compound; and I do hereby declare that the following is a full, clear, and exact description of the same.

The nature of my invention consists in a fertilizing compound for all agricultural and horticultural products; and it is composed of sulphur, saltpeter, salt, kainit, bone-phosphate, and lime, as will be hereinafter set forth. These ingredients are used in about the following proportions: sulphur, twenty-five pounds; saltpeter, forty pounds; salt, two hundred pounds; kainit, two hundred pounds; bone-phosphate, forty pounds; lime, one thousand four hundred and ninety-five pounds. These are all thoroughly mixed together, in a powdered state, by any of the usual methods.

This compound, known as the "Norfolk Fertilizer and Insecticide," will produce very beneficial effects. It is used either broadcast or in the furrow, and it serves to prevent rust in cotton, prevents ravages of cut-worms, destroys smut and rust germs in wheat, and is a permanent improver of soils, bringing them up to a high state of fertilization in a short time and at small cost.

I do not confine myself to the precise proportions of the ingredients as herein mentioned, as they may perhaps be varied, under certain circumstances, without affecting the virtue of the compound.

Having thus described my invention, what I claim as new, and desire to secure by Letters Patent, is—

The compound herein described, consisting of sulphur, saltpeter, salt, kainit, bone-phosphate, and lime, in or about the proportions specified.

WILLIAM DIXON STYRON.

Witnesses:
HENRY C. PERCY,
P. M. METCALF.